(12) United States Patent
Cardinale

(10) Patent No.: US 8,504,313 B2
(45) Date of Patent: Aug. 6, 2013

(54) ELECTRONIC VACUUM GAUGE AND SYSTEMS AND METHODS OF CALIBRATION AND OPERATION OF SAME

(76) Inventor: Dennis Cardinale, Plantation, FL (US)

( * ) Notice: Subject to any disclaimer, the term of this patent is extended or adjusted under 35 U.S.C. 154(b) by 212 days.

(21) Appl. No.: 13/052,408

(22) Filed: Mar. 21, 2011

(65) Prior Publication Data

US 2011/0231117 A1     Sep. 22, 2011

Related U.S. Application Data

(60) Provisional application No. 61/316,292, filed on Mar. 22, 2010.

(51) Int. Cl.
*G01F 17/00* (2006.01)

(52) U.S. Cl.
USPC .......................................................... 702/53

(58) Field of Classification Search
USPC ............................................................ 702/53
See application file for complete search history.

(56) References Cited

U.S. PATENT DOCUMENTS

| | | |
|---|---|---|
| 2,865,203 A | 12/1958 | Gruber |
| 5,539,674 A | 7/1996 | Barbier |
| 6,973,834 B1 | 12/2005 | Golan |
| 8,171,801 B2 * | 5/2012 | Le Noc et al. ................. 73/754 |
| 2007/0186658 A1 | 8/2007 | Borenstein |
| 2009/0027105 A1 | 1/2009 | Son |

\* cited by examiner

*Primary Examiner* — Aditya Bhat
(74) *Attorney, Agent, or Firm* — Mayback & Hoffman, P.A.; Gregory L. Mayback; Rebecca A. Tie

(57) ABSTRACT

An electronic thermistor-based vacuum gauge and systems and methods of calibration and operation of the same that require no calibration against a known vacuum standard to obtain high accuracy through broad vacuum and ambient temperature ranges. Additional features of the invention include a construction and method of improving battery life, a construction and method of detecting faulty vacuum sensors, a method for determining the state of calibration of a vacuum sensor, a method of quantifying vacuum leak rates, and a method of automatically alerting an operator when an evacuation process has concluded.

26 Claims, 8 Drawing Sheets

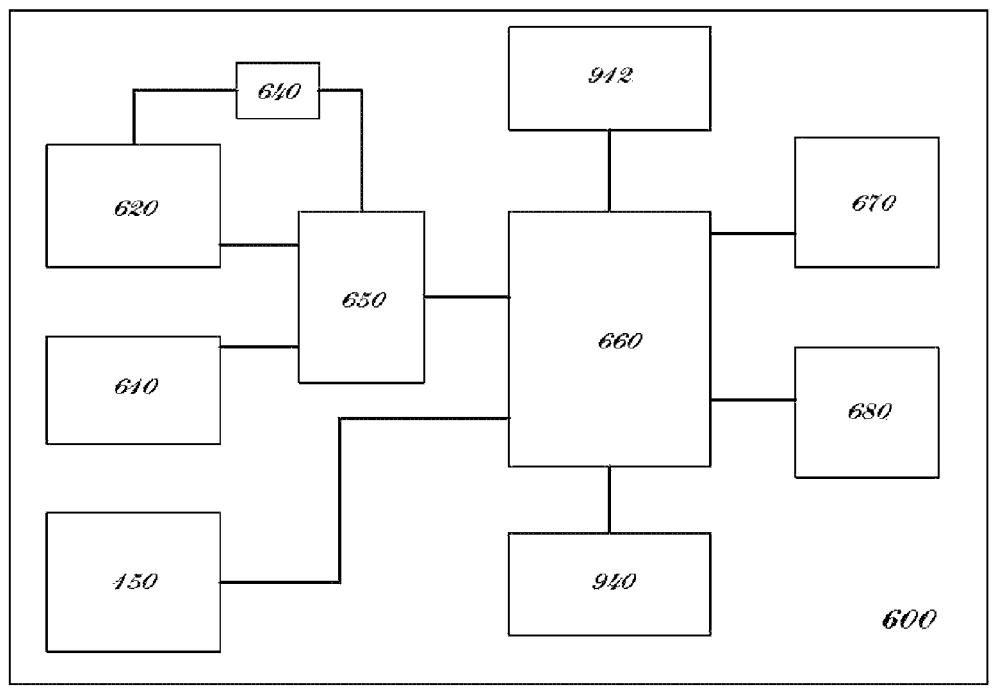
Fig. 9
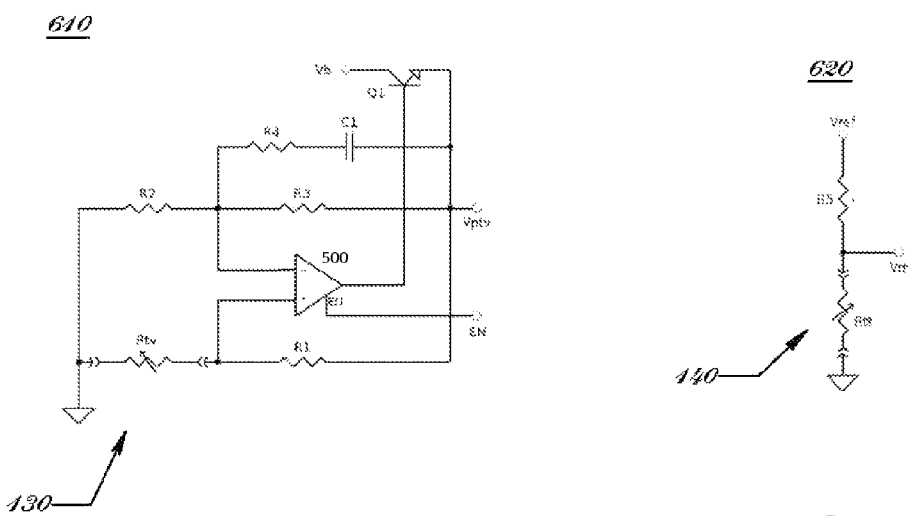
Fig. 10
Fig. 11

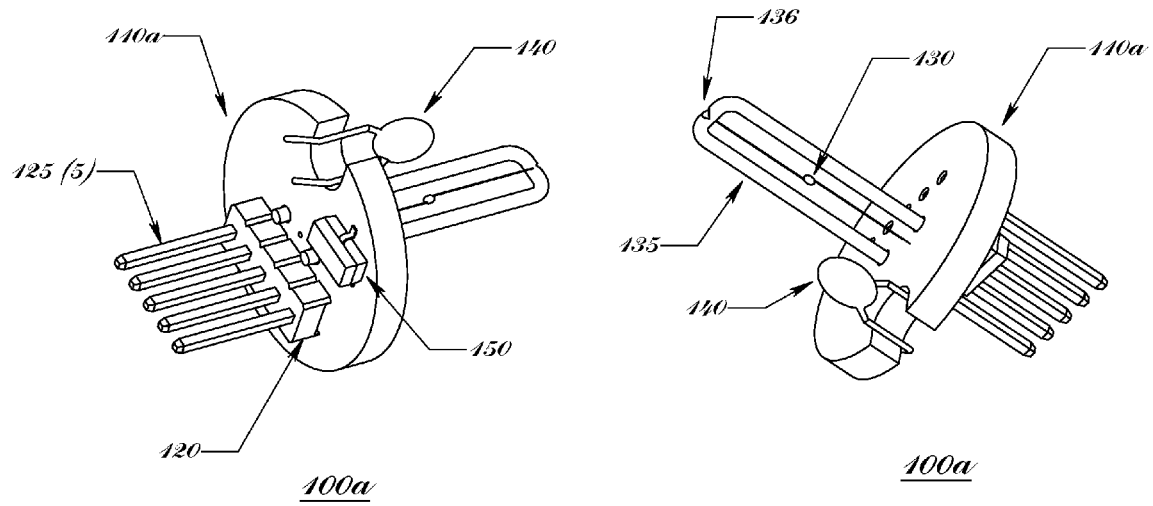
*Fig. 14*  *Fig. 15*
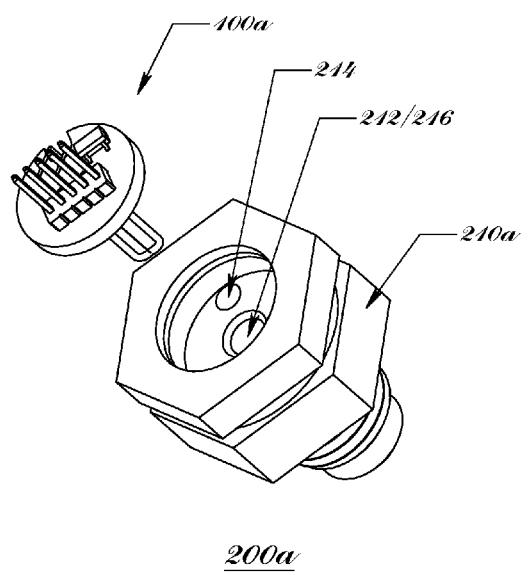
*Fig. 16*

ELECTRONIC VACUUM GAUGE AND SYSTEMS AND METHODS OF CALIBRATION AND OPERATION OF SAME

CROSS-REFERENCE TO RELATED APPLICATION

This application claims the priority, under 35 U.S.C. §119, of U.S. Provisional Patent Application Ser. No. 61/316,292, filed Mar. 22, 2010, the entire disclosure of which is hereby incorporated herein by reference in its entirety.

FIELD OF THE INVENTION

The present invention lies in the field of vacuum gauges for measuring a deep vacuum in industrial, commercial, and portable applications, such as in Heating, Ventilation, and Air Conditioning ("HVAC") systems. The present disclosure relates specifically to an electronic vacuum gauge that utilizes a temperature-sensing component, such as a thermistor, thermocouple, or a resistance temperature detector ("RTD") (e.g., platinum wire), which requires no calibration against a known vacuum standard to obtain high accuracy through broad ranges of vacuum and ambient temperatures.

BACKGROUND OF THE INVENTION

Methods of measuring a deep vacuum have existed for some time. The Mercury McLeod Gauge, invented in 1874 by Herbert G. McLeod, is a form of manometer that utilizes a column of mercury to indicate pressure. While this type of gauge is still in use today, its relatively large size and fragility preclude it from being practical for use in most industrial, commercial, and portable applications. Consequently, electronic vacuum gauge devices have largely replaced these gauges.

Electronic vacuum gauges utilize vacuum sensors that are generally of the Pirani, thermocouple, or thermistor type. These gauges operate on the principle that a rate of heat transfer by conduction into a surrounding gas is dependent upon gas pressure. The Pirani gauge, invented by Marcello Pirani in 1906, utilizes a platinum wire heated by an electrical current. As the surrounding gas pressure decreases, the temperature of the wire increases due to the reduction in the heat that is being conducted away from the wire and into the surrounding gas. The resistance of the wire increases with respect to the increasing temperature of the wire. Therefore, the measured resistance of the wire is indicative of the gas pressure of the surrounding gas.

The thermocouple type of gauge utilizes a thermocouple thermally connected to a small wire filament to measure the temperature of the filament, which is heated via an electrical current through the filament. An output voltage from the thermocouple is indicative of the filament temperature, which increases as gas pressure decreases.

A thermistor-based gauge operates similarly to the Pirani gauge, but utilizes a temperature sensitive resistor (i.e., a thermistor) rather than a platinum wire. The advantage to this configuration is that thermistors generally have a much higher resistance than the platinum wires used in Pirani gauges. Accordingly, thermistors exhibit a greater resistance change versus temperature change, thereby making resistance and, therefore, temperature measurements simpler and more accurate. There are two types of thermistor-based gauges, each sensing heat by a different method. The first type relies on a heating element that is in contact with the thermistor. The second type uses an electric current to heat the thermistor, thereby directly affecting the thermistor's resistance.

Any of the above techniques may utilize a temperature increase to indirectly measure pressure or, alternatively, may adjust power to maintain a particular temperature (or temperature differential with the surrounding gas). In the latter case, the power required to maintain the device's temperature can be used as an estimate of vacuum pressure, as it is well known in the art that the square of a thermistor's voltage is indicative of pressure.

All of these vacuum sensing techniques are gas-temperature sensitive, where the amount of heat conducted away from the device and into the surrounding gas at any given gas pressure is dependent upon the difference between the temperature of the device and the temperature of the surrounding gas. Therefore, for accuracy across a broad range of ambient (gas) temperatures with these gauges, some form of temperature compensation must be employed. Generally, the sensing device is maintained at a constant differential temperature from the surrounding gas temperature using a secondary temperature-measuring device. Alternatively, the sensing device is maintained at a constant temperature, a secondary temperature-measuring device being used to compute the differential temperature between the vacuum-sensing device and the surrounding gas. The resulting value is used to adjust the vacuum-sensing device's response to changing pressure.

In practice, the response curve of such a vacuum-sensing device is roughly log-linear between the pressures of 1 and 25,000 microns. In this range, conduction of heat to the gas molecules dictates the response curve. When operated at constant temperature, the power dissipated by the device resembles an "S" curve on a log-linear graph. Above approximately the 25,000-microns mark, convective cooling dominates the curve and the response curve rapidly asymptotes to near the atmospheric value. Below approximately the 1-micron mark, thermal conduction through the device's metallic leads and radiative cooling dominate the response curve, thereby yielding yet another asymptote. Therefore, vacuum sensors based upon the thermal conduction of gas are generally acceptable for use only where the measurements are constrained between the two extremes—i.e., 1 and 25,000 microns. In HVAC service, for example, the approximate range of 10 to 10,000 microns is desirable.

Aside from temperature sensitivities, there are other disadvantageous issues with such existing vacuum sensors. First, the power required to maintain the temperature of the sensor at any given pressure not only depends on the ambient temperature, but also depends upon the construction of the sensor, its overall surface area and geometry, the materials used, the presence of any surface contamination, the diameter, length, and conductivity of the lead wire, the size and geometry of the gas cavity, and a number of other unpredictable variables. The sensor, itself, has a specified tolerance based on its manufacture, which means that the resistance of one sensor at any given temperature may be significantly different than that of another at the same temperature, especially in low-cost applications. Therefore, each sensor possesses its own unique response curve with respect to pressure and, as a result, must be individually calibrated against a vacuum reference to achieve any kind of practical accuracy. Because the response curve is only roughly log-linear, a simple two-point calibration is generally not adequate. Instead, many data points need to be calibrated throughout the specified range of the gauge in question, and over a range of temperatures.

Calibrating a vacuum gauge is difficult, time-consuming, and expensive. A high quality vacuum system is required, along with leak-proof gas connections. A standards-traceable master gauge must be incorporated into the system, and the pressure must be repeatedly changed and stabilized for each calibration point. Such a system can be automated to limit the amount of human interaction and decrease calibration time, but such a system still requires constant and repeated maintenance and requires a significant amount of capital resources. In addition, no field technician or end-user of the gauge will typically have this type of maintenance equipment. Therefore, such a gauge requiring calibration must be sent back to the factory for recalibration and, depending on the application, recalibration is frequently needed. Even after proper calibration, a production gauge may not operate to its published specifications in the field. This may be due to the user simply not operating the gauge at the same temperature as when it was calibrated.

Therefore, a need exists for an electronic vacuum gauge that requires no calibration against a vacuum reference while, at the same time, providing high accuracy across a broad range of ambient temperatures.

Many prior-art gauges utilize field-replaceable, per-calibrated sensors so that, in the case of a sensor failure, the sensor may be replaced without the requirement of recalibrating the gauge instrument. This is generally achieved by stamping a calibration code on the exterior of the sensor, which is input into the gauge instrument in some fashion by the operator. This process is an error prone technique and requires the attention of the operator to perform properly. Therefore, a need exists for an electronic vacuum gauge that automatically acquires calibration information from the vacuum sensor without intervention by the operator.

The accuracy of a vacuum-sensing device may change through time, either through component value changes or through gradual contamination of the vacuum-sensing device. There is currently no method, save utilizing a second known-to-be-good gauge, for determining that a vacuum-sensing device, or its associated gauge instrument, is operating within its specified accuracy. Therefore, a need exists for a vacuum gauge instrument that can automatically determine if it is operating within its specified accuracy and a method for automatically determining with a vacuum gauge instrument if the instrument is operating within its specified accuracy.

As a vacuum sensor is in direct contact with the gas being measured, any contaminants in the gas, such as oil, may contaminate the sensor. This will cause inaccurate vacuum measurements, or will cause the vacuum gauge instrument to cease functioning all together. The vacuum gauge sensor may also become faulty for any of a number of reasons, including physical failure. Therefore, a need exists for a vacuum gauge instrument that can automatically determine if a vacuum sensor is contaminated or faulty due to some other cause and a method for automatically determining with a vacuum gauge if a vacuum sensor associated therewith is contaminated or faulty due to some other cause.

Since a vacuum gauge sensor requires significant power to heat the vacuum-sensing device, such vacuum gauges suffer from short battery life, or require the use of mains power for long-term, continuous operation. Therefore, a need exists for a vacuum gauge instrument with a reduced power requirement for the vacuum gauge device to, thereby, increase the overall battery life or to eliminate the need for mains power and an automatic method for reducing the power requirement of a vacuum gauge device to, thereby, increase overall battery life or to eliminate the need for mains power.

Evacuation procedures generally require achieving a minimum predetermined pressure, and holding at least that minimum pressure for a predetermined amount of time. Generally, this is performed by an operator with a clock. This requires the continuous attention of the operator until the evacuation process is complete. Therefore, a need exists for a vacuum gauge device with an automatic method of monitoring an evacuation process and signaling an operator when the process has been successfully completed.

Yet another evacuation procedure may require the system under evacuation to hold a vacuum for a predetermined amount of time with any increases in pressure being indicative of leaks or moisture in the evacuated system. This is generally preformed by an operator watching the gauge for a period of time and manually computing changes in pressure during that time. Therefore, a need exists for a vacuum gauge instrument that can automatically, and instantly, compute and indicate an accurate leak rate, or the rate of pressure increase versus time.

SUMMARY OF THE INVENTION

The invention provides an electronic vacuum gauge and systems and methods of calibration and operation of vacuum gauges that overcome the hereinafore-mentioned disadvantages of the heretofore-known devices and methods of this general type and that can automatically, and instantly, compute and indicate an accurate leak rate, or the rate of pressure increase versus time.

With the foregoing and other objects in view, there is provided, in accordance with the invention, a method for computing a gas pressure of a vacuum system includes the steps of providing a vacuum-measuring system with a vacuum sensor and an electrical circuit. The vacuum sensor has a sensor housing shaped to form a substantially sealed cavity containing a volume of gas, the cavity having a port in fluid communication with the surrounding environment to allow the volume of gas to enter the cavity from the surrounding environment, a first temperature sensing device at least partially exposed to the gas contained in the cavity, and a second temperature sensing device thermally coupled to the sensor housing, a temperature of the sensor housing being representative of a temperature of the gas contained in the cavity. The electrical circuit has a constant temperature controller operatively connected to the first temperature sensing device and operable to output a signal representative of a power dissipated by the first temperature sensing device, at least one circuit element operatively connected to the second temperature sensing device and operable to convert an output of the second temperature sensing device into an output signal representative of the temperature of the second temperature sensing device, a microprocessor operable to compute a pressure of the gas contained in the cavity, an analog-to-digital converter operatively connected to the microprocessor, to the constant temperature controller, and to the at least one circuit element, and operable to convert the output signals of the constant temperature controller and the at least one circuit element into a digital signal to be processed by the microprocessor, an output device connected to the microprocessor and operable to indicate an output of the microprocessor, and at least one non-volatile memory device associated with the microprocessor. The vacuum-measuring system is calibrated by exposing the vacuum sensor to atmospheric pressure, bringing the temperature of the sensor housing, and thereby the temperature of the second temperature sensing device, to a first pre-determined temperature, while varying the temperature of the sensor housing and the second temperature sensing device across a range of pre-defined temperature values, periodically computing a group of data sets that correspond to the power dissipated by the first temperature sensing device as outputted by the constant temperature controller and the temperature of the second temperature sensing device as outputted by the at least one circuit element, until a second pre-determined temperature is reached, generating a series of coefficients of a polynomial equation by applying each of the data sets to a polynomial regression algorithm, a power computed by the polynomial equation versus temperature being predictive of a power dissipated by the first temperature sensing device at atmospheric pressure at a set of temperature values as indicated by the second temperature sensing device, and storing the series of coefficients in the non-volatile memory device. A gas pressure of the vacuum system is computed with the vacuum-measuring system by sealingly and fluidically connecting the port to the vacuum system to cause a volume of gas from the vacuum system to enter the cavity, computing the power dissipated by the first temperature sensing device as outputted by the constant temperature controller and the temperature of the second temperature sensing device as outputted by the at least one circuit element, computing an expected value of the power dissipated by the first temperature sensing device at atmospheric pressure and at the temperature of the second temperature sensing device by applying the computed temperature of the second temperature sensing device to the polynomial equation having the coefficients generated during the calibration step, normalizing the computed power dissipated by the first temperature sensing device by dividing the computed power by the expected value of the power dissipated by the first temperature sensing device, and computing the gas pressure using the normalized value of the power dissipated by the first temperature sensing device.

With the objects of the invention in view, there is also provided a method for computing a gas pressure of a vacuum system includes the steps of calibrating a vacuum-measuring system by exposing a housing of a vacuum sensor to atmospheric pressure, the housing having a cavity in which a pressure of a gas is to be measured, bringing a temperature of the housing, and thereby a temperature of a housing temperature sensing device, to a first pre-determined temperature, while varying the temperature of the housing and the housing temperature sensing device across a range of pre-defined temperature values, periodically computing a group of data sets that correspond to a power dissipated by a gas temperature sensing device at least partially disposed in the cavity and the temperature of the housing temperature sensing device until a second pre-determined temperature is reached, generating a series of coefficients of a polynomial equation by applying each of the data sets to a polynomial regression algorithm, a power computed by the polynomial equation versus temperature being predictive of a power dissipated by the gas temperature sensing device at atmospheric pressure at a set of temperature values as indicated by the housing temperature sensing device, and storing the series of coefficients. A gas pressure of the gas is computed with the vacuum-measuring system by causing a volume of the gas to be measured to enter the cavity, computing the power dissipated by the gas temperature sensing device and the temperature of the housing temperature sensing device, computing an expected value of the power dissipated by the gas temperature sensing device at atmospheric pressure and at the temperature of the housing temperature sensing device by applying the computed temperature of the housing temperature sensing device to the polynomial equation having the coefficients generated during the calibration step, normalizing the computed power dissipated by the gas temperature sensing device by dividing the computed power by the expected value of the power dissipated by the gas temperature sensing device, and computing the gas pressure of the gas using the normalized value of the power dissipated by the gas temperature sensing device.

With the objects of the invention in view, there is also provided a method for computing a gas pressure of a vacuum system includes the step of providing a vacuum sensor with a housing defining a cavity, the housing having a gas temperature sensing device at least partially disposed in the cavity and a housing temperature sensing device, causing a volume of a gas to be measured to enter a cavity, computing a power dissipated by the gas temperature sensing device and a temperature of the housing temperature sensing device, computing an expected value of the power dissipated by the gas temperature sensing device at atmospheric pressure and at the temperature of the housing temperature sensing device by applying the computed temperature of the housing temperature sensing device to a polynomial equation having pre-defined coefficients generated by periodically computing a group of data sets while varying a temperature of the housing and the housing temperature sensing device across a range of pre-defined temperature values, the group of data sets corresponding to a power dissipated by the gas temperature sensing device and the temperature of the housing temperature sensing device until a second pre-determined temperature is reached, and creating a series of the coefficients of the polynomial equation by applying each of the data sets to a polynomial regression algorithm, a power computed by the polynomial equation versus temperature being predictive of a power dissipated by the gas temperature sensing device at atmospheric pressure at a set of temperature values as indicated by the housing temperature sensing device, normalizing the computed power dissipated by the gas temperature sensing device by dividing the computed power by the expected value of the power dissipated by the gas temperature sensing device, and computing the gas pressure of the gas using the normalized value of the power dissipated by the gas temperature sensing device.

In accordance with another mode of the invention, the electrical circuit further comprises a power source.

In accordance with a further mode of the invention, the output device is human-readable.

In accordance with an added mode of the invention, at least one of the first and second temperature sensing devices is one of a thermistor, a thermocouple, and a Resistance Temperature Detector element.

In accordance with an additional mode of the invention, the constant temperature controller is operable to hold constant an operating temperature of the first temperature sensing device and to measure the power dissipated by the first temperature sensing device.

In accordance with yet another mode of the invention, the at least one circuit element is one of a voltage divider, a thermocouple driving circuit, and a Resistance Temperature Detector driving circuit.

In accordance with yet a further mode of the invention, the gas pressure is computed by applying the normalized value of the power dissipated by the first temperature sensing device to one of a pre-determined curvilinear equation and a lookup table.

In accordance with yet an added mode of the invention, the output device is a user-interface operable to indicate the gas pressure contained in the cavity.

In accordance with yet an additional mode of the invention, the output device is an audible alarm.

In accordance with again another mode of the invention, the gas pressure computing step is carried out by computing a value proportional to the logarithm of the gas pressure by applying the normalized value of the power dissipated by the first temperature sensing device to one of a pre-determined curvilinear equation and a lookup table and applying the value proportional to the logarithm of the gas pressure to a pre-determined exponential equation.

In accordance with again a further mode of the invention, the series of coefficients generated during the calibration step is applied to a polynomial transformation to compute an actual operating temperature of the first temperature sensing device, the temperature of the second temperature sensing device is subtracted from the computed actual operating temperature of the first temperature sensing device to compute a temperature difference between the first and second temperature sensing devices, a correction factor is determined by applying the computed temperature difference to one of a pre-determined curvilinear equation and a lookup table, and the correction factor is applied to at least one of the normalized value of the power dissipated by the first temperature sensing device prior to computing the gas pressure, the value proportional to the logarithm of the gas pressure prior to determining the gas pressure, and the computed gas pressure.

In accordance with again an added mode of the invention, when the gas pressure of the vacuum system is known to be at atmospheric pressure, the normalized value of the power dissipated by the first temperature sensing device is determined during the step of computing the gas pressure and recalibration is indicated as necessary if the normalized value is outside a pre-determined range of a value of 1.000 under the condition of atmospheric pressure.

In accordance with again an additional mode of the invention,

In accordance with still another mode of the invention, the pre-determined range is within one of 0.05% of 1.000 and 0.1% of 1.000.

In accordance with still a further mode of the invention, the output device is an audible alarm operable to indicate that the vacuum-measuring system needs to be re-calibrated.

In accordance with still an added mode of the invention, a contamination condition of the vacuum sensor is determined by computing the power dissipated by the first temperature sensing device as outputted by the constant temperature controller and the temperature of the second temperature sensing device as outputted by the at least one circuit element, computing an expected value of the power dissipated by the first temperature sensing device at atmospheric pressure and at the temperature of the second temperature sensing device by applying the computed temperature of the second temperature sensing device to the polynomial equation whose coefficients were generated during the calibration step, and determining that the computed power dissipated by the first temperature sensing device exceeds the expected value of the power dissipated by the first temperature sensing device by a pre-determined amount.

In accordance with still an additional mode of the invention, the amount of power dissipated from the power source is conserved by carrying out the gas pressure computing step periodically and, if the gas pressure exceeds a pre-determined pressure after a first pre-determined period of time, the power source is disconnected from the vacuum sensor, after a second pre-determined period of time, power from the power source is reconnected and applied to the vacuum sensor, the gas pressure computing step is carried out, and, if the computed pressure exceeds the pre-determined pressure, the disconnecting step, the reconnecting step, and the gas pressure computing step is repeated.

In accordance with a concomitant mode of the invention, the power computed by the polynomial equation versus temperature is predictive of at least one of a power dissipated by the first temperature sensing device at atmospheric pressure at a set of temperatures including at least a portion of the range of pre-defined temperature values as indicated by the second temperature sensing device, a power dissipated by the first temperature sensing device at atmospheric pressure at a set of temperatures within the range of pre-defined temperature values as indicated by the second temperature sensing device, a power dissipated by the first temperature sensing device at atmospheric pressure at a set of temperatures greater than the range of pre-defined temperature values as indicated by the second temperature sensing device, and a power dissipated by the first temperature sensing device at atmospheric pressure at a set of temperatures greater than and including the range of pre-defined temperature values as indicated by the second temperature sensing device;

Although the invention is illustrated and described herein as embodied in an electronic vacuum gauge and systems and methods of calibration and operation of vacuum gauges, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to further illustrate various embodiments and to explain various principles and advantages all in accordance with the present invention. Advantages of embodiments of the present invention will be apparent from the following detailed description of the exemplary embodiments thereof, which description should be considered in conjunction with the accompanying drawings in which:

FIG. 9 is a block circuit diagram of an electronic circuit of a vacuum gauge assembly according to an exemplary embodiment of the present invention;

FIG. 10 is an electronic schematic circuit diagram of a vacuum-sensing thermistor driver of the vacuum gauge assembly according to an exemplary embodiment of the present invention;

FIG. 11 is an electronic schematic circuit diagram of a temperature-sensing thermistor driver of the vacuum gauge according to an exemplary embodiment of the present invention;

FIG. 14 is a perspective view of a vacuum sensor PCB assembly according to a second exemplary embodiment of the present invention;

FIG. 15 is a perspective view of the vacuum sensor PCB assembly of FIG. 14 in an inverted position; and FIG. 16 is an exploded perspective view of a vacuum sensor assembly according to a second exemplary embodiment of the present invention with the vacuum sensor PCB assembly of FIGS. 14 and 15.

DETAILED DESCRIPTION OF THE INVENTION

Figure 1:
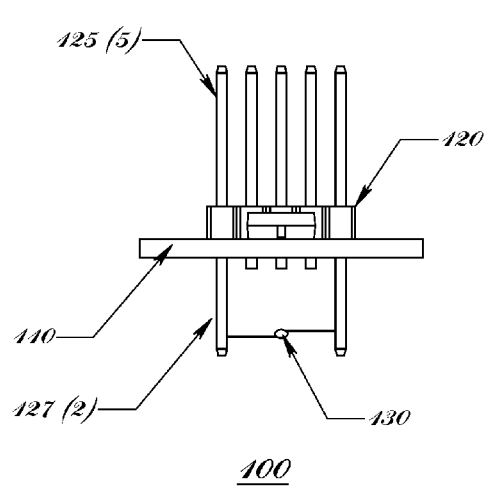
FIG. 1 is a side elevational view of a vacuum sensor PCB assembly according to a first exemplary embodiment of the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for any claims and as a representative basis for teaching one skilled in the art to variously employ the present invention in virtually any appropriately detailed structure. Further, the terms and phrases used herein are not intended to be limiting; but rather, to provide an understandable description of the invention. While the specification may conclude with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Referring now to the figures of the drawings in detail and first, particularly to FIG. 1 thereof, there is shown an exemplary embodiment of a vacuum sensor assembly of a vacuum gauge assembly according to the present invention. The vacuum gauge assembly is comprised of the vacuum sensor assembly and a vacuum gauge PCB. The vacuum sensor assembly may be comprised of any suitable device that enables gas vacuum pressure sensing. For example, referring now to FIGS. 1 through 4 of the drawings, there is shown, according to first exemplary embodiment, a vacuum sensor assembly 200 that is comprised of a vacuum sensor PCB assembly 100 and a sensor housing 210.

Figure 2:
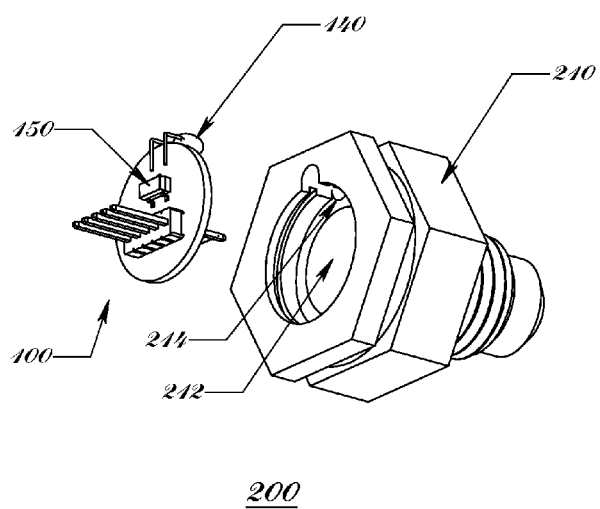
FIG. 2 is an exploded perspective view of a vacuum sensor assembly according to a first exemplary embodiment of the present invention with the vacuum sensor PCB assembly of FIG. 1.
Figure 3:
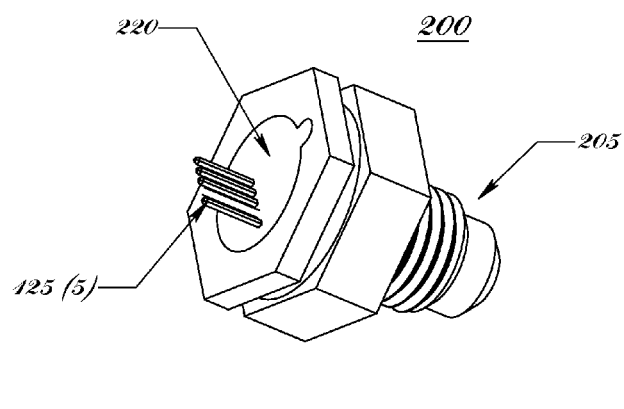
FIG. 3 is a perspective view of the vacuum sensor assembly of FIG. 2 from a sealed side thereof.
Figure 4:
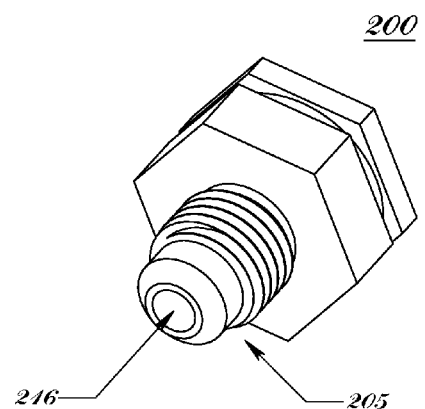
FIG. 4 is a perspective view of the vacuum sensor assembly of FIG. 2 from a gas port side thereof.

The vacuum sensor PCB assembly 100, according to a first exemplary embodiment, is comprised of a PCB 110, an interconnect or pin header 120, a temperature-sensing device 140, a vacuum-sensing temperature device 130, and a non-volatile memory 150 (see FIG. 2). The interconnect 120 has a plurality of conductive pins 125 (e.g., five in number) for electrically coupling the vacuum sensor assembly 100 to the vacuum gauge PCB as described in detail below. The interconnect 120 may be a standard pin header with appropriate lead lengths and pitch for the component side and the anterior side of the PCB 110. Some of the pins on the anterior side may be cut to avoid mechanical interference with the vacuum-sensing temperature device 130.

The vacuum-sensing temperature device 130 can be any temperature element that (a) can be exposed to the gas pressure, (b) can be self or externally heated to a constant temperature, and (c) can provide, either directly or indirectly, an indication (either relative or absolute) of the power required to maintain it at a constant temperature. The vacuum-sensing temperature device 130 can be, for example, a thermistor, a platinum RTD, or a thermocouple thermally connected to a heater coil. The vacuum-sensing temperature device 130 is coupled to the interconnect 120 on a reverse side of the vacuum sensor PCB 110 by, for example, soldering or welding. In the exemplary embodiment, the vacuum-sensing temperature device is a thermistor, herein referred to as the vacuum-sensing thermistor. The vacuum-sensing thermistor 130 may be any thermistor that is suitable for the application. For example, for purposes of a low power, fast warm-up, and quick thermal response operation, a thermistor with a low dissipation factor, e.g., approximately 0.1 mW/° C., may be chosen, where, in such a case, the temperature response curve and overall temperature accuracy is not critically important.

The temperature-sensing device 140 may be, for example, any device that is suitable for the application, including but not limited to thermistor, thermocouple, RTD, or silicon type temperature sensors. However, the best performance is achieved with a device having a high temperature accuracy (i.e., an overall accuracy of +/−0.1° C.), where, in such a case, the temperature response curve and dissipation factor are not critically important. Alternatively, the temperature sensing device 140 may be chosen such that it has high linearity (or is linearizable) and repeatability, though not necessarily high accuracy.

One benefit of the present invention is that, unlike existing temperature-based, vacuum measuring applications, the functions of the vacuum-sensing temperature device 130 and the temperature-sensing device 140 are separated so that the two elements do not need to be "matched," where they cancel or track each other. Rather, the vacuum sensing element can be chosen such that the vacuum sensing characteristics are emphasized and the temperature sensing element can be chosen such that its temperature sensing characteristics are emphasized. There is no need to match the characteristics of the two. The exemplary embodiment illustrates a vacuum sensor utilizing a high accuracy thermistor as the temperature-sensing device 140.

A non-volatile memory 150 may be mounted upon the vacuum sensor PCB 110. This memory 150 may be used to store a table or coefficients representing the predetermined vacuum response curve for the particular model of vacuum-sensing thermistor 130 that is used. It may also be used to store a table or coefficients representing the predetermined temperature response curve of the particular model of the temperature-sensing thermistor 140 that is used. In this way, alternative thermistor devices or different manufactures may be used, while maintaining compatibility with existing gauges, without needing to re-program the gauge. In general, the non-volatile memory 150 may be any suitable memory that is capable of read/write access and long-term storage of data. Further, to reduce the number of header pins 125 used, a one-wire memory may be used.

The sensor housing 210 may be machined of brass or similar material, and can be plated for durability. A gas-pressure-measuring cavity 212 forms the gas pressure measurement volume. A hole 214 may contain the temperature-sensing thermistor 140. A suitable fitting 205 may be disposed at the opposite side of the housing 210 to accommodate a fluid connection between the gas pressure measuring volume cavity 212 and a non-illustrated vacuum apparatus through a gas port 216. For purposes of illustration, fitting 205 is depicted as a ¼-inch flare connection machined on the opposite side of the housing 210.

To assemble the vacuum sensor assembly 200, the vacuum sensor PCB assembly 100 is inserted into the sensor housing 210. Epoxy-based, thermally conductive adhesive may be used to create a tight thermal connection between the temperature-sensing thermistor 140 and the hole 214 of the sensor housing 210. An epoxy-based potting compound 220 may also be used to fill the cavity behind the vacuum sensor PCB assembly to create a tight seal and to prevent vacuum leaks.

In FIGS. 14, 15, and 16, a second exemplary embodiment of a vacuum sensor PCB assembly 100a and vacuum sensor assembly 200a are illustrated. A bead support frame 135 is constructed of solid copper bus wire of suitable gauge (e.g., 24 AWG) and is mounted upon the vacuum sensor PCB 110a. The vacuum-sensing thermistor 130 may then be stretched vertically above the vacuum sensor PCB 110a, its leads being electrically connected to and mechanically supported by the top of the bead support frame 135 and the vacuum sensor PCB 110a via soldering or welding. A groove 136 formed into the bead support frame 135 may assist in proper centering of vacuum-sensing thermistor 130 during construction. Copper traces (not illustrated) etched on the vacuum sensor PCB 110a may then make the electrical connections between the bead support frame 135, the opposite thermistor lead, and the interconnect 125. This vertical construction allows for the gas pressure measuring cavity 212 and the gas port 216 of the vacuum sensor housing 210a to be combined into a single structure, thereby creating a significantly smaller gas measuring volume. The advantage of such a construction is that the gas confined within the smaller volume will maintain a temperature much closer to that of the vacuum sensor housing 210a as measured by the temperature-sensing thermistor 140, thereby increasing the overall accuracy of the resulting vacuum gauge.

Figure 5:
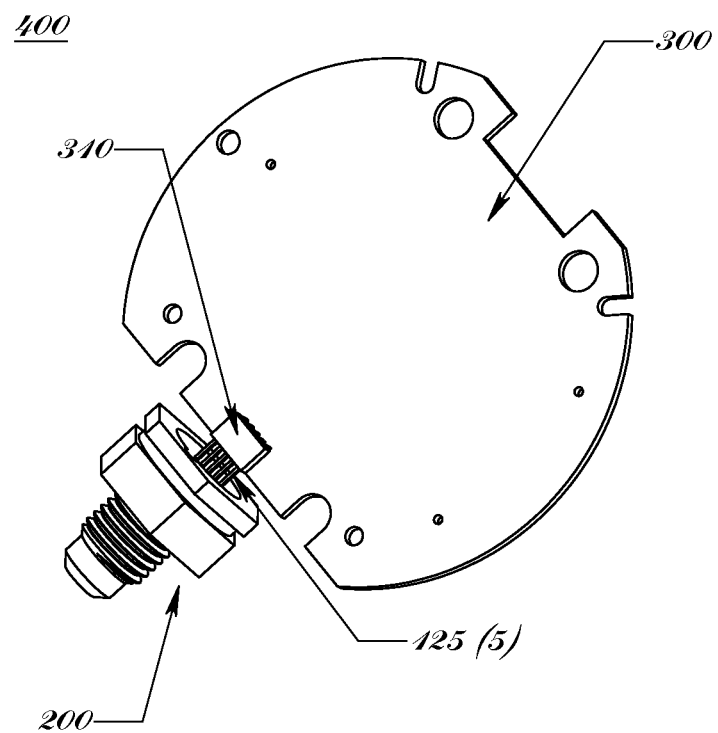
FIG. 5 is a perspective view of a vacuum sensor according to an exemplary embodiment of the present invention with the vacuum sensor assembly of FIG. 2.

Referring now to FIG. 5, to assemble the vacuum gauge assembly 400, the completely assembled vacuum sensor assembly 200 or 200a is electrically coupled to a vacuum gauge PCB 300 by way of the exposed conductive pins 125 of the interconnect 120, which correspond to and matingly attach to a connector 310 of the vacuum gauge PCB 300.

Figure 6:
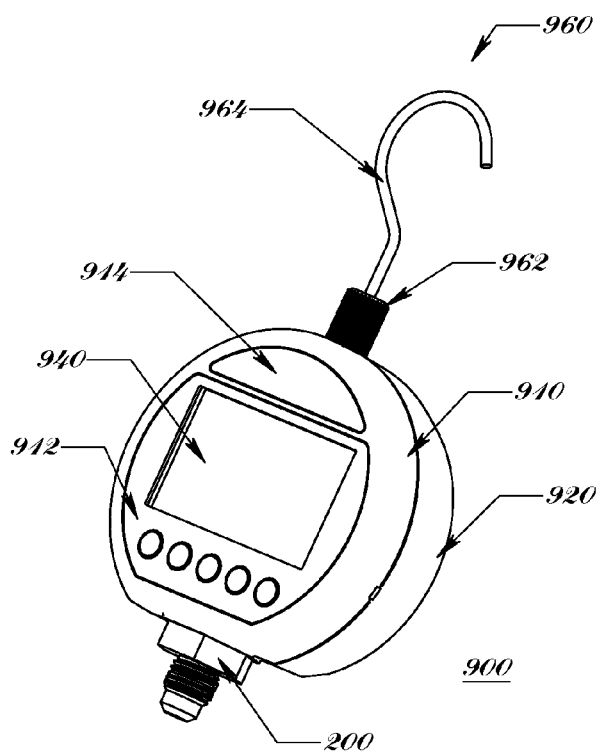
FIG. 6 is a perspective view of a vacuum gauge assembly according to an exemplary embodiment of the present invention from a front side of thereof.
Figure 7:
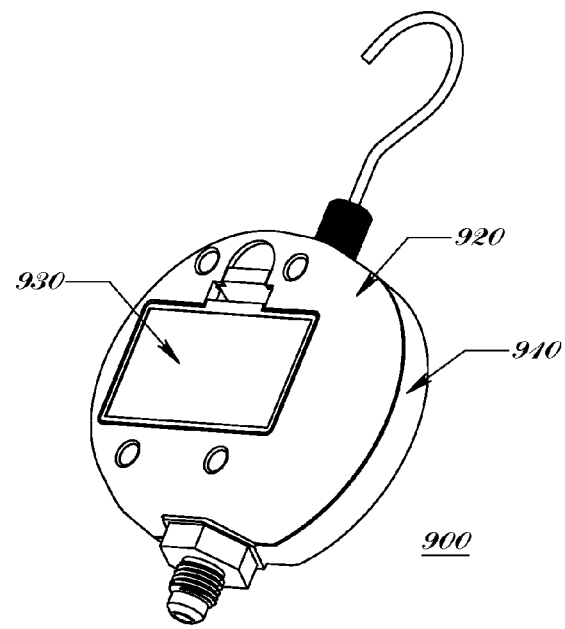
FIG. 7 is a perspective view of the vacuum gauge assembly of FIG. 6 from a rear side thereof.
Figure 8:
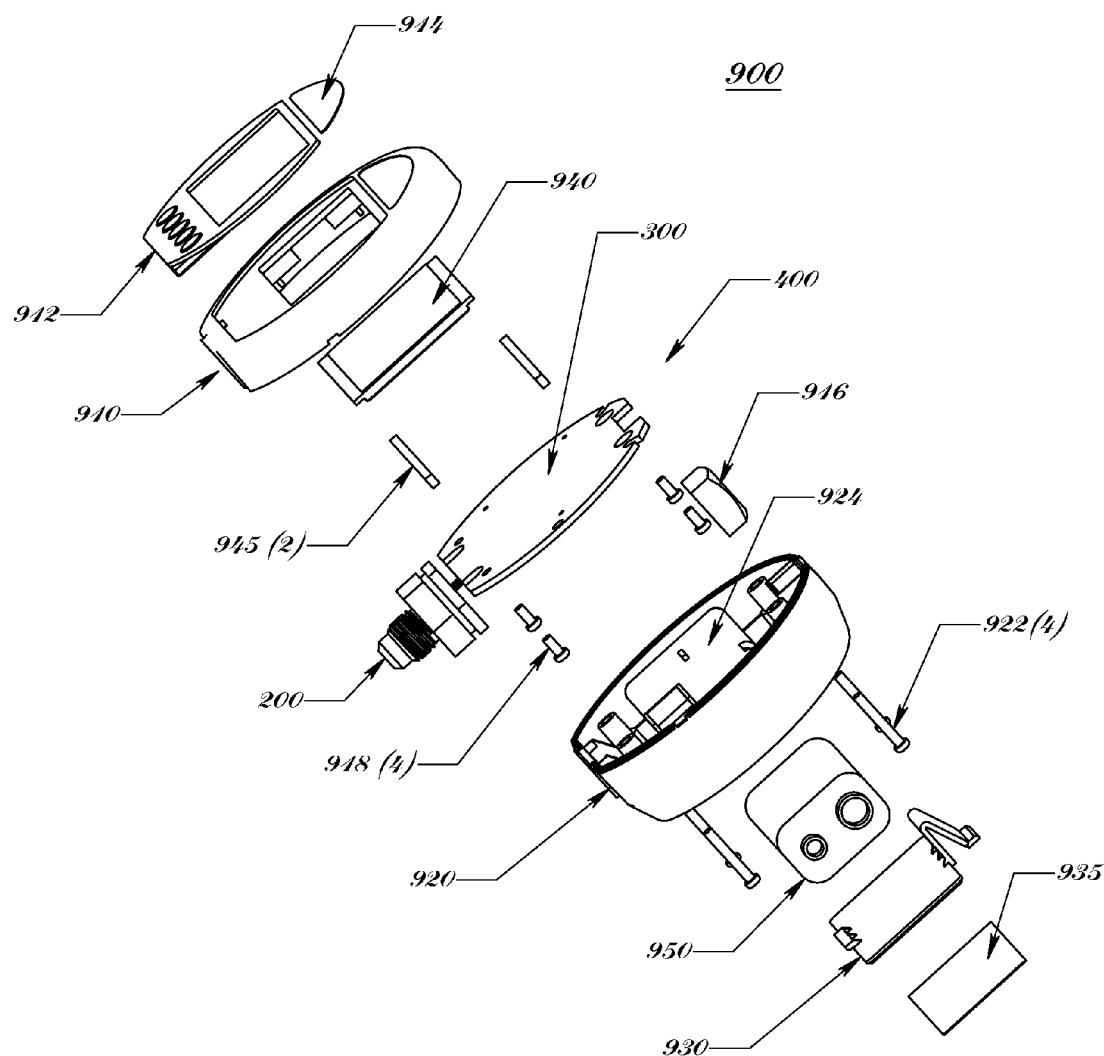
FIG. 8 is an exploded perspective view of the vacuum gauge assembly of FIG. 6.

Referring to FIGS. 6, 7, and 8, the assembly of an exemplary embodiment of the completed portable vacuum gauge instrument 900 is depicted. An input device 912 (e.g., a keypad) having controls and markings for operating the instrument, and an identifying label 914 may be applied to a front shell 910, which, if desired, can be injection-molded. A display 940 or other suitable indicating device (e.g., an LCD) is installed along with electrically connecting polymeric connectors 945. The vacuum gauge assembly 400 is secured in place using, for example, screws 918. In addition, a removable hanger assembly 960 having a hanger 964 may be attached to the device using a nut 916. A rear shell 920, which, too, can be injection-molded, is then secured in place using, for example, screws 922 (e.g., four in number). A power source 950 is contained within a battery compartment 924 and secured in place by a battery cover 930, which may have an identifying label 935. Any suitable power source 950 may be employed. For example, a 9V battery could be used. It is contemplated that the vacuum gauge instrument 900 may be entirely (or partially) replaced by a computer system, as opposed to being an independent, stand-alone device.

For operating the vacuum gauge assembly, shown in FIG. 9 is an electronic block circuit diagram 600 of the vacuum gauge assembly in accordance with an exemplary embodiment of the present invention. Circuit 600 may be comprised of a vacuum-sensing thermistor driver 610 (for operation of the vacuum-sensing thermistor 130), a temperature-sensing thermistor driver 620 (for operation of the temperature-sensing thermistor 140), the memory 150 (e.g., non-volatile) of the vacuum sensor PCB assembly 100 or 100a, a reference voltage generator 640, an A/D converter 650, a microprocessor 660, an input device 912 (e.g., a keypad), a display 940 (e.g., an LCD or other suitable indicating device), a second memory device 670 (e.g., non-volatile) for storing calibration values and operational data, and an indicator 680 (e.g., an audible sounding device). The electronic circuit is powered by power source 950 (see, e.g., FIG. 8). The driver circuits 610 and 620 may be incorporated into the sensor assembly 200 or 200a, rather than within the instrument 900. Alternatively, all the analog components up to and including the A/D converter 650, may be incorporated inside the vacuum sensor assembly 200 or 200a, thereby creating a field-replaceable, interchangeable, vacuum sensor assembly.

As shown in FIG. 10, the vacuum-sensing thermistor driver 610 is comprised of an operational amplifier 500, fixed resistors $R_1$, $R_2$, $R_3$, and $R_4$, a capacitor $C_1$, and a transistor $Q_1$. Driver 610 is operatively connected to the vacuum-sensing thermistor 130 by, for example, the pin header or interconnect 120 and the mating connector 310 of the vacuum gauge PCB 300. The resistance of the vacuum-sensing thermistor 130 is temperature sensitive, its value being designated as $R_{tv}$. For high accuracy applications, resistors $R_1$, $R_2$, and $R_3$ may be of high tolerance (e.g., 0.1%) and the operational amplifier 500 may be of a low input offset voltage type (e.g., chopper or otherwise stabilized).

In operation, the operational amplifier 500 drives the base of the transistor $Q_1$, which is connected as a voltage follower component. The voltage output of the transistor's emitter, designated as $V_{ptv}$, is applied to the two voltage dividers, $R_1$ and $R_{tv}$, and $R_2$ and $R_3$. Transistor $Q_1$ may be eliminated if the operational amplifier's output power is capable of driving the two dividers directly. The voltage output nodes of each divider are connected to the non-inverting and inverting inputs of the operational amplifier. This creates a feedback loop that forces the voltage $V_{ptv}$ to have a value such that the ratios $R_1:R_{tv}$ and $R_3:R_2$ are equal, resulting in the following equation:

$$R_{tv}=(R_1 \cdot R_2)/R_3.$$

At this resistance of $R_{tv}$, the vacuum-sensing thermistor 130 will be operating at a fixed, though unknown, temperature $T_{tv}$ within a certain range according to its temperature curve specification. Resistor $R_4$ and capacitor $C_1$ form a low pass filter to stabilize the feedback loop and prevent oscillation.

From this, the value of $R_{tv}$ may be chosen based on the desired thermistor operating temperature according to the manufacturer's resistance curve versus temperature specifications. For example, an $R_{tv}$ of 87.5Ω of one manufacturer may result in a fixed temperature within the range of 100° C. to 135° C. It follows that $R_1$ is computed and chosen such that $V_{ptv}$ is less than the $V_{in,max}$ of the A/D converter 650 under the maximum differential temperature $T_D$ ($T_{tv,max}-T_{o,min}$) and maximum of the dissipation factor DF of the vacuum-sensing thermistor 130. Further, it follows that $R_2$ and $R_3$ are chosen such that $R_2/R_3=R_{tv}/R_1$. Finally, $R_4$ and $C_1$ are experimentally chosen based on stability and quickness of the response.

When operating at a steady-state, the power dissipated $P_{tv}$ by the vacuum-sensing thermistor 130 can be accurately computed by the following equation:

$$P_{tv}=V_{ptv}^2/R_{EQ},$$

wherein:

$$R_{EQ}=R_1 \cdot (R_2+R_3)^2/(R_2 \cdot R_3).$$

As such, the tolerance of the vacuum-sensing thermistor has no bearing on the accuracy of the power computation.

The power dissipated $P_{tv}$ by the vacuum-sensing thermistor 130 is comprised of three components: (1) power conducted away from the thermistor by the surrounding gas molecules via convection and/or conduction; (2) power conducted away from the thermistor by the thermistor's own electrical connections; and (3) power radiated away from the thermistor's surface. The power dissipated by the surrounding gas molecules is the dominant source of power dissipation and is the quantity used to measure the gas pressure. The remaining sources of power dissipation are parasitic, but can be normalized away according to the present invention.

In addition, an enable pin EN of the operational amplifier provides a way for facilitating disconnection of power to the driver circuit, thus allowing implementation of a method for conserving battery power under some conditions according to an exemplary embodiment of the invention.

As shown in FIG. 11, an exemplary embodiment of the temperature-sensing thermistor driver 620 is comprised of a voltage divider having, for example, a fixed resistor $R_5$ and the temperature-sensing thermistor 140. $R_5$ may be chosen such that $V_{tt}$ provides the most accurate temperature derivation within the operating temperature range. This may be determined, for example, through a spreadsheet that maps $V_{tt}$ versus temperature using $R_{tt}$ as specified by the manufacturer. Driver 620 is operatively connected to the temperature-sensing thermistor 140 by, for example, the pin header 120 and the mating connector 310 on the vacuum gauge PCB 300. The resistance of the temperature-sensing thermistor 140 is temperature sensitive, its value being designated as $R_{tt}$. A reference voltage powers the voltage divider, and the voltage output of the divider, $V_{tt}$, is easily converted into absolute temperature using a curvilinear equation or lookup table as provided by the manufacturer of the temperature-sensing thermistor. The reference voltage generator 640 provides the reference voltage. For high accuracy applications, resistor $R_5$ may be of high tolerance (e.g., 0.1%) and the reference voltage 650 may be of high quality (i.e., low drift, low noise).

The voltage outputs $V_{ptv}$ and $V_{tt}$ of the driver circuits 610 and 620 and the reference voltage generated by the reference voltage generator 640 are operatively connected to the A/D converter 650. The A/D converter 650, the non-volatile memory device 150, the keypad 912, the LCD 940 (or suitable indicating display), the non-volatile memory device 670, and the audible sounding device 680 are each operatively connected to the CPU 660. The A/D converter 650 may be any suitable analog-to-digital converter that is capable of converting analog voltages, $V_{ptv}$ and $V_{tt}$, into corresponding digital signals that can be processed by the CPU 660. A high-resolution device will facilitate greater overall accuracy and ultimate computational resolution, though lower resolution A/D converters may be used to reduce the overall cost at the expense of diminished accuracy and/or resolution.

The keypad 912 may, for example, be a tactile laminated keypad, a set of pushbuttons, a capacitive touch pad, or any suitable device for receiving input from an operator. Signals from the keypad 912 may be operatively connected to and processed by the CPU 660 or processed by a dedicated keypad driver operatively connected to the CPU 660.

The LCD 940 or suitable indicating device may be any device capable of displaying vacuum pressure data to an operator. The LCD 940 or suitable indicating device may be driven directly from the CPU 660 or through a dedicated discrete display driver operatively connected to the CPU 660.

The audible sounding device 680 may be a loud speaker or any device capable of alerting an operator to particular conditions relating to, for example, leakage rate, as explained in detail below. The audible sounding device 680 may be directly driven by the CPU 660 or driven by an audio controller operatively connected to the CPU 660.

The second memory device 670 may be any memory device (e.g., non-volatile) that is capable of storing calibration values and operational data. The memory 670 may be a discrete device or integrated into the CPU 660.

The CPU 660 may be any suitable microprocessor, microcontroller, digital signal processor (DSP), distributed computing system, or other computer capable of capturing and processing the data from the A/D converter 650, receiving input from the keypad 912, and displaying data on the LCD 940.

For any given vacuum-sensing thermistor 130, there is a great deal of variance in its properties, even among devices of the same part number from the same manufacturer and within the same lot. In addition, variations during manufacturing of the vacuum sensor assembly 200 and the materials used will affect the thermal response of the vacuum-sensing thermistor 130 in unpredictable ways. Finally, component tolerances of the vacuum-sensing thermistor driver 610, the voltage reference generator 640, and the A/D converter 650 will add yet additional errors with respect to the computation of actual power dissipated by the thermistor 130. A method of normalizing these sources of variations is important to achieve a vacuum gauge instrument of high accuracy, an example of which is provided by the invention as described below.

The power dissipated $P_{tva}$ by a thermistor having a dissipation factor DF in free air of ambient temperature $T_A$ at atmospheric pressure is approximated by the following equation:

$$P_{tva} = DF \cdot (T_{tv} - T_A)$$

where, as mentioned earlier, $T_{tv}$ is the operating temperature of the thermistor. However, this approximation is not satisfactory for high-accuracy, high-resolution, vacuum-measurement applications. It has been discovered that the response curve of the thermistor is more accurately reflected by the following second order equation (1):

$$P_{tva} = DF' \cdot (T_{tv} - T_A)^2 + DF \cdot (T_{tv} - T_A). \quad (1)$$

Figure 17:
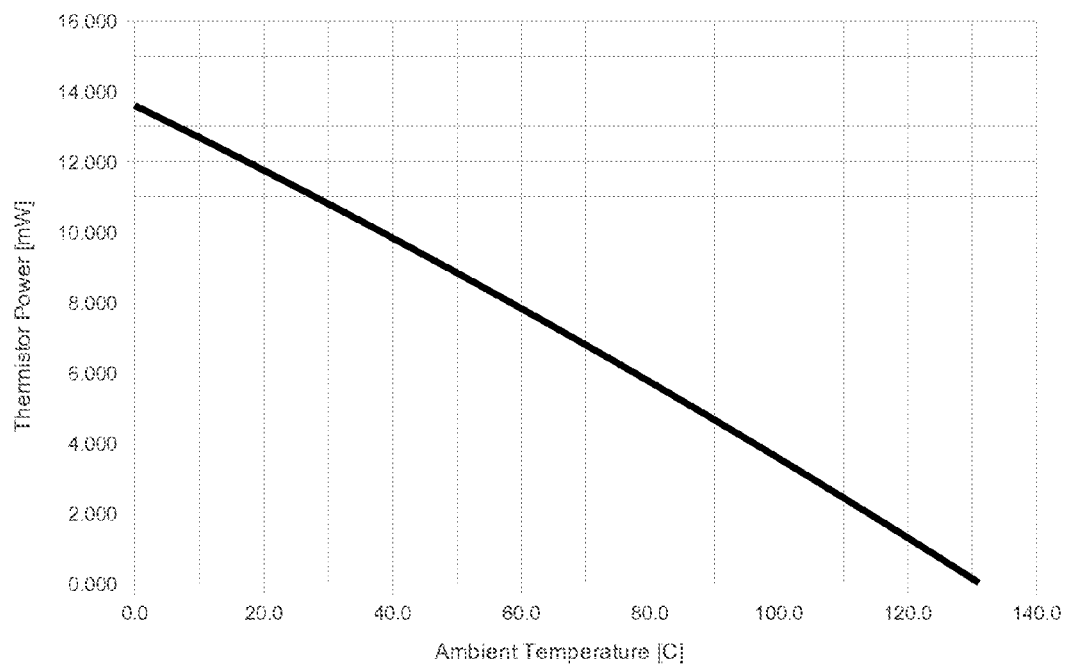
FIG. 17 is a graph depicting the power dissipated by an exemplary thermistor-based vacuum-sensing device versus ambient gas temperature at atmospheric pressure according to the exemplary embodiment of the present invention.

Equation (1) governs the power dissipated within a few hundredths of a percent over an ambient temperature range of less than 0° C. to near $T_{tv}$, which is quite satisfactory for vacuum measurement applications. Equations of additional orders may be used, but there are rapidly diminishing improvements in accuracy and rapidly increasing computation complexities for each additional order. FIG. 17 illustrates a power vs. temperature response curve of an actual vacuum sensing thermistor operating at atmospheric pressure in a varying ambient gas temperature from 0° C. through its constant operating temperature, i.e., $T_{tv}$, of approximately 130° C.

As there is a great deal of variation from part-to-part in the constant operating temperature $T_{tv}$ of the thermistor (its temperature at constant $R_{tv}$) and in its dissipation factors DF and DF', these are unknown values and must be determined to fully quantify the thermistor's characteristics. As the unknown $T_{tv}$ is held constant by the vacuum-sensing thermistor driver 610 (by holding $R_{tv}$ known and constant), the second order equation (1) above can be restated as the following second order polynomial equation (2):

$$P_{tva} = A \cdot T_A^2 + B \cdot T_A + C \quad (2)$$

wherein:

$$DF' = A;$$

$$DF = \sqrt{(B^2 - 4 \cdot A \cdot C)}; \text{ and}$$

$$T_{tv} = (B + \sqrt{(B^2 - 4 \cdot A \cdot C)}) / ((-2) \cdot A).$$

Therefore, once A, B, and C are determined, the thermistor characteristics of DF', DF, and $T_{tv}$ can be fully quantified. As equation (2) is a standard second-order polynomial equation, a solution for the coefficients A, B, and C can be realized through well-known statistical techniques. Specifically, by varying $T_A$ (an independent variable) in increments from high-to-low or low-to-high and over a broad range, and by measuring $P_{tva}$ (a dependent variable) at various points within that range, a polynomial regression computation can quickly and efficiently deduce the values of A, B, and C. When generating the data points for the statistical derivation of A, B, and C, it does not matter whether the temperature is increasing, decreasing, or fluctuating randomly as long as enough data points are acquired over time and representing a sufficient portion of the desired operating temperature range. For example, applying power vs. temperature data from a temperature of 0° C. to 20° C. with 0.1° C. increments acceptably computes a satisfactory A, B and C for an operating temperature range of −15° C. to 50° C.

Once the coefficients A, B, and C are computed to within an acceptable percentage of error, the thermistor's power at any gas pressure and any ambient temperature $T_A$ can be normalized, for example, in the following manner. First, the ambient temperature $T_A$ is measured from the temperature-sensing thermistor driver 620. Second, the power dissipated $P_{tv}$ by the vacuum-sensing thermistor is computed from the vacuum-sensing thermistor driver 610. Third, the expected power dissipation $P_E$ at atmospheric pressure and temperature $T_A$ is computed using equations (1) or (2), where $P_E$ is substituted for $P_{tva}$. Lastly, the normalized power dissipation $P_N$ is computed by the following equation:

$$P_N = P_{tv} / P_E. \quad (3)$$

At atmospheric pressure, the value of $P_N$ will be close to 1.000. In other words, the resulting value $P_N$ should be within a few hundredths of a percent of 1.000 at any given ambient temperature within the specified range, regardless of the style, construction, or variations of the vacuum-sensing thermistor, the variations in the vacuum sensor construction, or the component tolerances of the electronic circuits involved in the measurements. Accordingly, all sources of error are normalized away at atmospheric pressure.

As the gas pressure inside the vacuum sensor is reduced, fewer gas molecules are available to pull heat from the vacuum-sensing thermistor, thereby causing a reduction in $P_{tv}$ and a corresponding reduction in the calculated value of $P_N$. Therefore, under vacuum conditions, $P_N$ will always be a value less than 1.000.

Under vacuum conditions between 1 and 25,000 microns, the curve of $P_N$ versus gas pressure is roughly log-linear. Deduction of the shape of the curve is important for accurately computing gas pressure at any given $P_N$. At the higher range, near 25,000 microns, the curve asymptotes near a $P_N$ value of 1.000 due to convective conduction effects of the gas. At the lower range, near 1 micron, conductive effects of the heat through the vacuum-sensing thermistor's electrical connections and radiative effects of heat from the thermistor's surface cause yet another asymptote at a $P_N$ value of above 0.000 (typically, about 0.120). It has been discovered that these parasitic effects are also largely normalized out by the normalization process of equation (3), resulting in an accurately quantifiable curve for a given manufacturer and vacuum thermistor part number.

Figure 12:
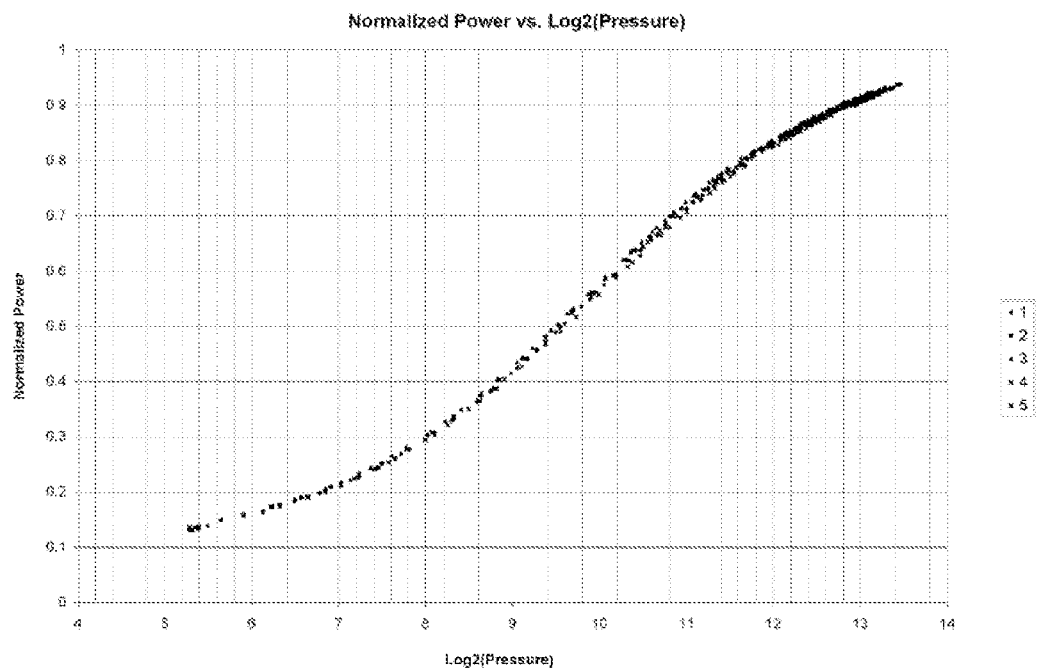
FIG. 12 is a graph depicting a normalized vacuum-sensing thermistor power versus gas pressure in an illustration of the curvilinear response of five vacuum sensors of the present invention.

Depicted in FIG. 12 is the normalized vacuum-sensing thermistor power $P_N$ plotted against the base-2 logarithm of gas pressure, $\log_2(P)$, in an illustration of the curvilinear response of five vacuum sensors of the present invention. A curve mapping $P_N$ to $\log_b(P)$ can be expressed as a sixth-order polynomial equation (4) as follows:

$$P_{lc} = \log_b(P) = C_6 \cdot P_N^6 + C_5 \cdot P_N^5 + C_4 \cdot P_N^4 + C_3 \cdot P_N^3 + C_2 \cdot P_N^2 + C_1 \cdot P_N + C_0 \quad (4)$$

where P is the actual gas pressure, $P_{lc}$ is the logarithm base b of the computed gas pressure, $P_N$ is the computed normalized power from equation (3), and the coefficients, $C_0$-$C_6$, are pre-determined constants for a particular manufacturer and thermistor part number. The base of the logarithm, b, can be any suitable value to facilitate computation, such as "10," "e," or "2," with the corresponding coefficients adjusted for the particular base value used. The coefficients are generated using statistical analysis of a statistically significant sample of vacuum sensor assemblies 200 and 200a constructed with a particular vacuum-sensing thermistor model. The coefficient values may be stored permanently in a non-volatile memory device 150 of the vacuum sensor PCB assembly 100. As a result, alternative thermistors with different sets of coefficients may be used in production while still maintaining the accuracy of the pressure calculations for that particular sensor. Alternatively, these values may be stored permanently in the non-volatile memory device 670 of the vacuum gauge instrument 900.

From equation (4), the computed pressure $P_c$ is computed as follows:

$$P_c = b^{Plc} \quad (5)$$

Figure 13:
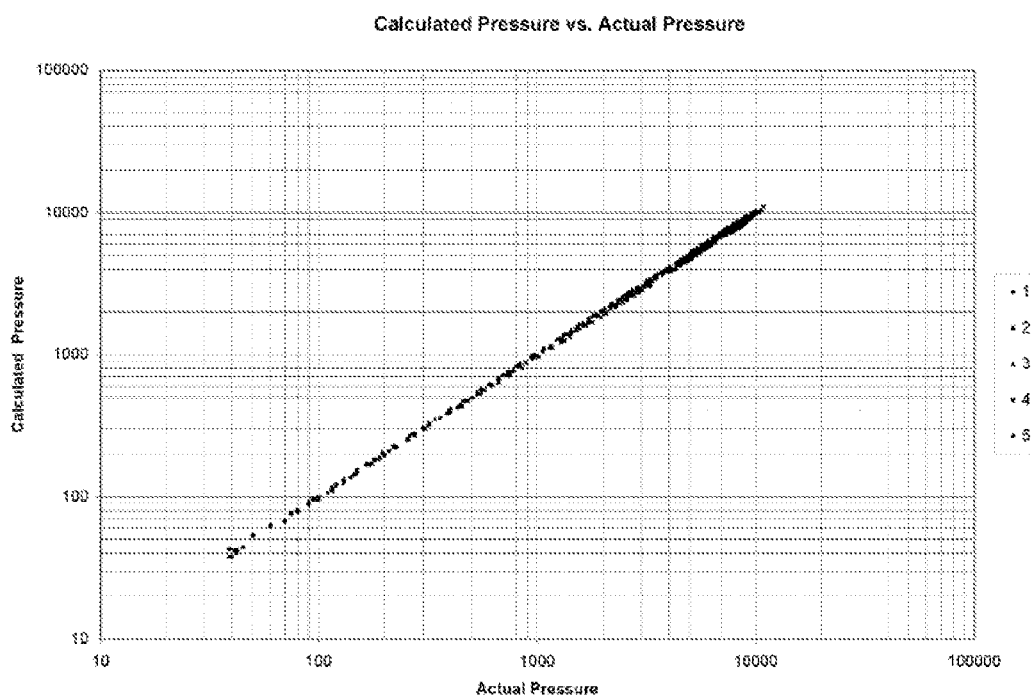
FIG. 13 is a graph depicting a resulting linearization of response curves of the five vacuum sensors of FIG. 12.

The resulting computed pressure $P_c$ may be constrained from about 0 to about 25,000 microns for the computation to be valid. FIG. 13 illustrates the calculated pressure versus the actual pressure of the five vacuum sensors of FIG. 12 using the pre-determined coefficients $C_0$-$C_6$ of the sensors. In all cases, each pressure computation is within +/−6% of the actual measured pressure, with the exception of a few outliers due to experimental error. In no case does the error exceed 10%. It has been discovered that, through the application of rigorous manufacturing processes, the overall accuracy can be maintained better than ±5%±5 microns from 0 to 25,000 microns on a mass-production basis.

It is contemplated that, within the scope of the present invention, yet another function, $\log_b(P) = f(P_N)$, or even another function $P = f(P_N)$ (eliminating the exponential calculation), may be deduced. Also, another function, a 5th order polynomial of the form:

$$\log_b(P+O) = C_5 \cdot P_N^5 + C_4 \cdot P_N^4 + C_3 \cdot P_N^3 + C_2 \cdot P_N^2 + C_1 \cdot P_N + C_0, \quad (6)$$

actually provides superior low-pressure accuracy while maintaining high-pressure accuracy and requires significantly fewer CPU operations to perform. In this case, the pressure offset O is additionally computed and stored with the $C_0$-$C_5$ coefficients.

Accordingly, a beneficial consequence of the normalization method described above is a method of accurately calibrating the vacuum gauge without the need to calibrate under vacuum conditions against a known vacuum standard. In accordance with an exemplary embodiment of the present invention, this calibration method is comprised of the following steps:

(a.i) exposing the vacuum sensor to atmospheric pressure;
(a.ii) bringing the vacuum sensor to a predetermined low temperature;
(a.iii) raising the temperature of the vacuum sensor while periodically computing the vacuum-sensing thermistor's power using the output signal of the constant temperature controller and the temperature-sensing thermistor's temperature using the output signal of the voltage divider until a predetermined high temperature is achieved;
(a.iv) applying each power/temperature data set from step (iii) to a polynomial regression algorithm to compute the coefficients A, B, and C of the polynomial equation (2) such that the power computed by the equation versus temperature is predictive of the power dissipated by the first thermistor at atmospheric pressure at any temperature within a predetermined operative temperature range of the gauge as reported by the second thermistor; and
(a.v) storing the computed polynomial coefficients A, B, and C and/or the derived coefficients DF', DF, and $T_{tv}$ in non-volatile memory for future use in computing the actual pressure of the gas contained in the sensor housing.

At any time after performing this calibration method, the vacuum gauge instrument 900 may be re-calibrated in the field by repeating steps (i) through (v) above. Indeed, in an exemplary embodiment, the CPU 660 of the vacuum gauge instrument 900 may be preprogrammed to automate the above sequence.

As indicated previously, equation (4) with its associated coefficients $C_0$-$C_6$ normalize out nearly all sources of error, providing an accurate method for determining actual gas pressure across a broad range of temperatures within about +/−5%. For even greater accuracy, it is possible to generate additional sets of coefficients $C_0$-$C_6$ at different temperatures, resulting in multiple curves that can be used to interpolate (or extrapolate) even more accurate pressure computations.

After completing the calibration steps of the vacuum gauge instrument 900 as described above, the vacuum gauge instrument 900 may be operated to compute the actual pressure of the gas contained in the sensor housing by the following steps according to an exemplary embodiment of the present invention:

(a.i) exposing the vacuum sensor to the gas pressure to be computed by connecting the gauge to the gas of the vacuum system through, for example, the fitting 205;
(a.ii) computing the vacuum-sensing thermistor's power using the output signal of the constant temperature controller and the temperature-sensing thermistor's temperature using the output signal of the voltage divider;
(a.iii) applying the second thermistor's temperature to the polynomial equation (2) with the coefficients A, B, and C, or to the equation (3) with the derived coefficients DF', DF, and $T_{tv}$, generated during the calibration step to compute the expected first thermistor's power at atmospheric pressure and at the second thermistor's temperature;

(a.iv) normalizing the computed first thermistor's power at the current gas pressure by dividing by the computed first thermistor's power at atmospheric pressure and at the second thermistor's temperature; and (a.v) computing the gas pressure by applying the normalized first thermistor's power to a predetermined curvilinear equation or lookup table, i.e. equations (4) and (5).

Alternatively, a set of correction factors versus $T_D$ (for each set of coefficients, $T_D$ is a corresponding temperature differential that is equal to the difference between $T_{tv}$ and $T_A$) for a specific vacuum-sensing thermistor 610 part number may be determined and stored in non-volatile memory devices 150 or 670 that can be used to correct the computations of equations (3), (4), and/or (5) for varying values of $T_D$. Where correction factors are taken into consideration, the operation of the vacuum gauge would involve the following additional steps in accordance with an exemplary embodiment of the present invention:

(i) applying the coefficients computed in the calibration step to a polynomial transformation to compute the actual operating temperature of the vacuum-sensing thermistor;

(ii) computing the temperature difference between the vacuum-sensing thermistor and temperature-sensing thermistor by subtracting the temperature-sensing thermistor's temperature from the computed actual operating temperature of the first thermistor;

(iii) computing a correction factor by applying the temperature difference to a predetermined curvilinear equation or lookup table; and (iv) applying the correction factor to any one of:
the computed normalized first thermistor's power;
the value proportional to the logarithm of the computed gas pressure; or
the computed gas pressure.

In accordance with another exemplary embodiment of the present invention, the enable (EN) control of the operational amplifier of the vacuum-sensing thermistor circuit 610 provides a method for elongating the battery life of the vacuum gauge 900. While operating at pressures above 25,000 microns, the vacuum sensor provides no useful information to the operator (the normalized power is close to 1.000), and the power dissipation by the vacuum-sensing thermistor 130 is at a maximum under these conditions. The EN control of the amplifier may be operatively connected to the CPU 660. When disabled, the output of the amplifier is set to high impedance, turning off the base of transistor Q1, thereby disconnecting current flow into the vacuum-sensing thermistor 130. A power-saving feature, therefore, may be implemented where the CPU operates utilizing two modes, i.e., "active" and "sleep" modes. The periods of "sleep" between "active" modes may be 30 seconds or more, significantly extending the life of the battery by up to a factor of 10 at a pressure of 25,000 microns and above.

Because it has been determined that the value of $P_N$ will always be 1.000 or less for all gas pressures from deep vacuum to atmosphere, the present invention also provides a method for detecting a faulty vacuum sensor based on the knowledge that values of $P_N > 1.000$ indicate a faulty vacuum sensor. Generally, the causes for a fault are disconnection or destruction of the vacuum-sensing thermistor 130, by contamination with oil or other fluids that greatly increase the power required to maintain constant temperature $T_{tv}$, and/or a failure to maintain the constant temperature $T_{tv}$ due to excessive contamination. As the vacuum-sensing thermistor 130 and the temperature-sensing thermistor 140 are electrically connected to the vacuum gauge PCB assembly 400 by interconnect 120 and mating connector 310 in the exemplary embodiment, an analysis of the computed value $P_N$, the voltage $V_{tt}$ of the temperature thermistor driving circuit 620, and the voltage $V_{ptv}$ of the vacuum-sensing thermistor driver 610 yields at least the following possible conclusions:

1. $P_N \leq 1.000$ and $V_{tt}$ is not saturated (max value): vacuum gauge sensor is operating normally;
2. $P_N > 1.000$ and $V_{tt}$ is not saturated: oil or contamination in sensor or vacuum-sensing thermistor 130 is faulty;
3. $P_N > 1.000$ and $V_{ptv}$ is saturated: heavy oil or contamination in sensor; or
4. $V_{tt}$ is saturated: sensor disconnected or temperature-sensing thermistor 140 is faulty.

The state of the sensor may then be reported to the operator through the LCD 940 or suitable indicating display and/or through an audible alarm by the audible sounding device 680.

Additionally, the value $P_N$ may be analyzed during periods when the gas pressure within the vacuum sensor is known to be at atmospheric pressure, thereby determining whether or not a calibration sequence is required. If $P_N$ is not sufficiently close to a value of 1.000, i.e. different by 0.05% to 0.1% or greater, under the condition of atmospheric pressure, the vacuum gauge instrument may alert the operator that such a calibration is required, for example, through an appropriate indication on the LCD 940 and/or an alarm from the audible sounding device 680.

In an additional aspect of this invention, it is useful to provide information to an operator regarding the possible presence and size of a vacuum leak. The CPU 660 may make successive gas vacuum measurements and compute a vacuum leak rate in, for example, units of microns per second. This leak rate may be indicated, for example, on the LCD 940 or suitable indicating display, and an audible alarm may sound from the audible sounding device 680 if the leak rate exceeds a specified maximum, as could be pre-programmed and/or selectively programmed by the operator.

In yet another exemplary aspect of this invention, an evacuation procedure may specify the need to reduce the gas pressure to a particular level and hold the pressure at that level or less for a minimum period of time. In this example, the CPU 660 may continuously monitor the gas pressure and start a timer when a certain pressure is achieved. At the expiration of a proper amount of time, evacuation success may be indicated, for example, on the LCD 940 or suitable indicating display and/or an audible alarm may sound from the audible sounding device 680. The pressure threshold and time period may be pre-programmed and/or selectively programmed by the operator.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for computing a gas pressure of a vacuum system, which comprises:

providing a vacuum-measuring system with:
  a vacuum sensor having:
    a sensor housing shaped to form a substantially sealed cavity containing a volume of gas, the cavity having a port in fluid communication with the surrounding environment to allow the volume of gas to enter the cavity from the surrounding environment;
    a first temperature sensing device at least partially exposed to the gas contained in the cavity; and
    a second temperature sensing device thermally coupled to the sensor housing, a temperature of the sensor housing being representative of a temperature of the gas contained in the cavity; and
  an electrical circuit having:
    a constant temperature controller operatively connected to the first temperature sensing device and operable to output a signal representative of a power dissipated by the first temperature sensing device;
    at least one circuit element operatively connected to the second temperature sensing device and operable to convert an output of the second temperature sensing device into an output signal representative of the temperature of the second temperature sensing device;
    a microprocessor operable to compute a pressure of the gas contained in the cavity;
    an analog-to-digital converter operatively connected to the microprocessor, to the constant temperature controller, and to the at least one circuit element, and operable to convert the output signals of the constant temperature controller and the at least one circuit element into a digital signal to be processed by the microprocessor;
    an output device connected to the microprocessor and operable to indicate an output of the microprocessor; and
    at least one non-volatile memory device associated with the microprocessor;
calibrating the vacuum-measuring system by:
  exposing the vacuum sensor to atmospheric pressure;
  bringing the temperature of the sensor housing, and thereby the temperature of the second temperature sensing device, to a first pre-determined temperature;
  while varying the temperature of the sensor housing and the second temperature sensing device across a range of pre-defined temperature values, periodically computing a group of data sets that correspond to:
    the power dissipated by the first temperature sensing device as outputted by the constant temperature controller; and
    the temperature of the second temperature sensing device as outputted by the at least one circuit element, until a second pre-determined temperature is reached;
  generating a series of coefficients of a polynomial equation by applying each of the data sets to a polynomial regression algorithm, a power computed by the polynomial equation versus temperature being predictive of a power dissipated by the first temperature sensing device at atmospheric pressure at a set of temperature values as indicated by the second temperature sensing device; and
  storing the series of coefficients in the non-volatile memory device; and
computing a gas pressure of the vacuum system with the vacuum-measuring system by:
  sealingly and fluidically connecting the port to the vacuum system to cause a volume of gas from the vacuum system to enter the cavity;
  computing the power dissipated by the first temperature sensing device as outputted by the constant temperature controller and the temperature of the second temperature sensing device as outputted by the at least one circuit element;
  computing an expected value of the power dissipated by the first temperature sensing device at atmospheric pressure and at the temperature of the second temperature sensing device by applying the computed temperature of the second temperature sensing device to the polynomial equation having the coefficients generated during the calibration step;
  normalizing the computed power dissipated by the first temperature sensing device by dividing the computed power by the expected value of the power dissipated by the first temperature sensing device; and
  computing the gas pressure using the normalized value of the power dissipated by the first temperature sensing device.

2. The method according to claim 1, wherein the electrical circuit further comprises a power source.

3. The method according to claim 2, which further comprises conserving the amount of power dissipated from the power source by:
  carrying out the gas pressure computing step periodically; and
  if the gas pressure exceeds a pre-determined pressure after a first pre-determined period of time:
    disconnecting the power source from the vacuum sensor;
    after a second pre-determined period of time, reconnecting and applying power from the power source to the vacuum sensor;
    carrying out the gas pressure computing step; and
    if the computed pressure exceeds the pre-determined pressure, repeating the disconnecting step, the reconnecting step, and the gas pressure computing step.

4. The method according to claim 1, wherein the output device is human-readable.

5. The method according to claim 4, wherein the output device is a user-interface operable to indicate the gas pressure contained in the cavity.

6. The method according to claim 4, wherein the output device is an audible alarm.

7. The method according to claim 1, wherein at least one of the first and second temperature sensing devices is one of:
  a thermistor;
  a thermocouple; and
  a Resistance Temperature Detector element.

8. The method according to claim 1, wherein the constant temperature controller is operable to hold constant an operating temperature of the first temperature sensing device and to measure the power dissipated by the first temperature sensing device.

9. The method according to claim 1, wherein the at least one circuit element is one of:
  a voltage divider;
  a thermocouple driving circuit; and
  a Resistance Temperature Detector driving circuit.

10. The method according to claim 1, wherein the gas pressure is computed by applying the normalized value of the power dissipated by the first temperature sensing device to one of a pre-determined curvilinear equation and a lookup table.

11. The method according to claim 1, which further comprises carrying out the gas pressure computing step by:
   computing a value proportional to the logarithm of the gas pressure by applying the normalized value of the power dissipated by the first temperature sensing device to one of a pre-determined curvilinear equation and a lookup table; and
   applying the value proportional to the logarithm of the gas pressure to a pre-determined exponential equation.

12. The method according to claim 1, which further comprises:
   applying the series of coefficients generated during the calibration step to a polynomial transformation to compute an actual operating temperature of the first temperature sensing device;
   subtracting the temperature of the second temperature sensing device from the computed actual operating temperature of the first temperature sensing device to compute a temperature difference between the first and second temperature sensing devices;
   determining a correction factor by applying the computed temperature difference to one of a pre-determined curvilinear equation and a lookup table; and
   applying the correction factor to at least one of:
      the normalized value of the power dissipated by the first temperature sensing device prior to computing the gas pressure;
      the value proportional to the logarithm of the gas pressure prior to determining the gas pressure; and
      the computed gas pressure.

13. The method according to claim 1, which further comprises:
   when the gas pressure of the vacuum system is known to be at atmospheric pressure, determining the normalized value of the power dissipated by the first temperature sensing device during the step of computing the gas pressure; and
   indicating that recalibration is necessary if the normalized value is outside a pre-determined range of a value of 1.000 under the condition of atmospheric pressure.

14. The method according to claim 13, wherein the pre-determined range is within one of:
   0.05% of 1.000; and
   0.1% of 1.000.

15. The method according to claim 13, wherein the output device is an audible alarm operable to indicate that the vacuum-measuring system needs to be re-calibrated.

16. The method according to claim 1, which further comprises determining a contamination condition of the vacuum sensor by:
   computing the power dissipated by the first temperature sensing device as outputted by the constant temperature controller and the temperature of the second temperature sensing device as outputted by the at least one circuit element;
   computing an expected value of the power dissipated by the first temperature sensing device at atmospheric pressure and at the temperature of the second temperature sensing device by applying the computed temperature of the second temperature sensing device to the polynomial equation whose coefficients were generated during the calibration step; and
   determining that the computed power dissipated by the first temperature sensing device exceeds the expected value of the power dissipated by the first temperature sensing device by a pre-determined amount.

17. The method according to claim 1, wherein the power computed by the polynomial equation versus temperature is predictive of at least one of:
   a power dissipated by the first temperature sensing device at atmospheric pressure at a set of temperatures including at least a portion of the range of pre-defined temperature values as indicated by the second temperature sensing device;
   a power dissipated by the first temperature sensing device at atmospheric pressure at a set of temperatures within the range of pre-defined temperature values as indicated by the second temperature sensing device;
   a power dissipated by the first temperature sensing device at atmospheric pressure at a set of temperatures greater than the range of pre-defined temperature values as indicated by the second temperature sensing device; and
   a power dissipated by the first temperature sensing device at atmospheric pressure at a set of temperatures greater than and including the range of pre-defined temperature values as indicated by the second temperature sensing device.

18. A method for computing a gas pressure of a vacuum system, which comprises:
   calibrating a vacuum-measuring system by:
      exposing a housing of a vacuum sensor to atmospheric pressure, the housing having a cavity in which a pressure of a gas is to be measured;
      bringing a temperature of the housing, and thereby a temperature of a housing temperature sensing device, to a first pre-determined temperature;
      while varying the temperature of the housing and the housing temperature sensing device across a range of pre-defined temperature values, periodically computing a group of data sets that correspond to:
         a power dissipated by a vacuum sensing temperature sensing device at least partially disposed in the cavity; and
         the temperature of the housing temperature sensing device until a second pre-determined temperature is reached;
      generating a series of coefficients of a polynomial equation by applying each of the data sets to a polynomial regression algorithm, a power computed by the polynomial equation versus temperature being predictive of a power dissipated by the vacuum sensing temperature sensing device at atmospheric pressure at a set of temperature values as indicated by the housing temperature sensing device; and
      storing the series of coefficients; and
   computing a gas pressure of the gas with the vacuum-measuring system by:
      causing a volume of the gas to be measured to enter the cavity;
      computing the power dissipated by the vacuum sensing temperature sensing device and the temperature of the housing temperature sensing device;
      computing an expected value of the power dissipated by the vacuum sensing temperature sensing device at atmospheric pressure and at the temperature of the housing temperature sensing device by applying the computed temperature of the housing temperature sensing device to the polynomial equation having the coefficients generated during the calibration step;
      normalizing the computed power dissipated by the vacuum sensing temperature sensing device by dividing the computed power by the expected value of the power dissipated by the vacuum sensing temperature sensing device; and computing the gas pressure of the gas using the normalized value of the power dissipated by the vacuum sensing temperature sensing device.

19. A method for computing a gas pressure of a vacuum system, which comprises:
providing a vacuum sensor with a housing defining a cavity, the housing having a vacuum sensing temperature sensing device at least partially disposed in the cavity and a housing temperature sensing device;
causing a volume of a gas to be measured to enter the cavity;
computing a power dissipated by the vacuum sensing temperature sensing device and a temperature of the housing temperature sensing device;
computing an expected value of the power dissipated by the vacuum sensing temperature sensing device at atmospheric pressure and at the temperature of the housing temperature sensing device by applying the computed temperature of the housing temperature sensing device to a polynomial equation having pre-defined coefficients generated by:
periodically computing a group of data sets while varying a temperature of the housing and the housing temperature sensing device across a range of pre-defined temperature values, the group of data sets corresponding to:
a power dissipated by the vacuum sensing temperature sensing device; and
the temperature of the housing temperature sensing device until a second pre-determined temperature is reached; and
creating a series of the coefficients of the polynomial equation by applying each of the data sets to a polynomial regression algorithm, a power computed by the polynomial equation versus temperature being predictive of a power dissipated by the vacuum sensing temperature sensing device at atmospheric pressure at a set of temperature values as indicated by the housing temperature sensing device;
normalizing the computed power dissipated by the vacuum sensing temperature sensing device by dividing the computed power by the expected value of the power dissipated by the vacuum sensing temperature sensing device; and
computing the gas pressure of the gas using the normalized value of the power dissipated by the vacuum sensing temperature sensing device.

20. A method for determining the exact temperature and thermal dissipation characteristics of an electrically heated temperature sensing device, immersed within a volume of gas, and operating at a constant temperature and under a pre-determined gas pressure, which comprises:
providing:
a first temperature sensing device for which the temperature and thermal dissipation characteristics are to be determined;
a volume operable to contain a gas, the first temperature sensing device being immersed therein;
a second temperature sensing device that is operable to measure the temperature of the gas contained within the volume; and
an electrical circuit comprising:
a constant temperature controller operatively connected to the first temperature sensing device and operable to maintain the first temperature sensing device at a constant temperature, and operable to produce an output representative of the power required to maintain the first temperature sensing device at the constant temperature;
at least one circuit element operatively connected to the second temperature sensing device and operable to convert an output of the second temperature sensing device into an output signal representative of the temperature of the second temperature sensing device;
a microprocessor operable to compute the temperature and thermal dissipation characteristics of the first temperature sensing device; and
an analog-to-digital converter operatively connected to the microprocessor, to the constant temperature controller, and to the at least one circuit element, and operable to convert the output signals of the constant temperature controller and the at least one circuit element into a digital signal to be processed by the microprocessor;
bringing the pressure of the gas contained within the volume to a pre-determined pressure;
bringing the temperature of the gas contained within the volume, and thereby the temperature of the second temperature sensing device, to a first pre-determined temperature;
while varying the temperature of the gas contained within the volume, and thereby while varying the temperature of the second temperature sensing device, periodically collecting a series of data sets that correspond to:
the power dissipated by the first temperature sensing device as outputted by the constant temperature controller; and
the temperature of the second temperature sensing device as outputted by the at least one circuit element; and
computing a series of coefficients of a polynomial equation by applying each of the data sets to a polynomial regression algorithm, such coefficients representing the exact temperature and thermal dissipation characteristics of the first temperature sensing device operating at a constant temperature and under a pre-determined gas pressure.

21. The method according to claim 20, wherein the first temperature sensing device is one of:
a thermistor;
a thermocouple; and
a Resistance Temperature Detector element.

22. The method according to claim 20, wherein the first temperature sensing device is one of:
self heated; and
externally heated.

23. The method according to claim 20, wherein the second temperature sensing device is one of:
a thermistor;
a thermocouple;
a Resistance Temperature Detector element; and
a temperature transducer.

24. The method according to claim 20, wherein the pre-determined pressure is atmospheric pressure.

25. The method according to claim 20, wherein the exact temperature and thermal dissipation characteristics of the first temperature sensing device comprise at least one of:
a temperature;
a dissipation factor; and
a first derivative of a dissipation factor.

26. The method according to claim 20, wherein the exact temperature and thermal dissipation characteristics of the first temperature sensing device are representative of at least one of:
  a temperature;
  a dissipation factor; and
  a first derivative of a dissipation factor.

\* \* \* \* \*